United States Patent
Brown (10) Patent No.: US 9,354,340 B2
(45) Date of Patent: May 31, 2016

(54) STRIKE AND DIP TOOLTIP FOR SEISMIC SECTIONS

(71) Applicant: Schlumberger Technology Corporation, Sugar Land, TX (US)

(72) Inventor: Walter Emerson Brown, The Woodlands, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 303 days.

(21) Appl. No.: 14/036,038

(22) Filed: Sep. 25, 2013

(65) Prior Publication Data

US 2014/0086011 A1 Mar. 27, 2014

Related U.S. Application Data

(60) Provisional application No. 61/706,662, filed on Sep. 27, 2012.

(51) Int. Cl.
*G01V 1/34* (2006.01)

(52) U.S. Cl.
CPC .................................. *G01V 1/345* (2013.01)

(58) Field of Classification Search
CPC ....................................................... G01V 1/345
USPC ....................................................... 367/53, 38
See application file for complete search history.

(56) References Cited

U.S. PATENT DOCUMENTS

| | | | | |
|---|---|---|---|---|
| 6,092,025 | A * | 7/2000 | Neff | G01V 1/30 702/10 |
| 8,200,465 | B2 * | 6/2012 | Suarez-Rivera | E21B 43/00 703/10 |
| 2008/0059898 | A1 * | 3/2008 | Deggelmann | G06F 3/048 715/764 |
| 2010/0228834 | A1 | 9/2010 | Hung et al. | |
| 2011/0166789 | A1 | 7/2011 | Barrow et al. | |
| 2012/0026832 | A1 | 2/2012 | Pepper et al. | |
| 2012/0050521 | A1 | 3/2012 | Fitzpatrick et al. | |
| 2012/0144306 | A1 | 6/2012 | Moody et al. | |
| 2014/0029383 | A1 * | 1/2014 | Dasgupta | G01V 1/303 367/73 |

FOREIGN PATENT DOCUMENTS

FR WO 2011023313 A1 * 3/2011 ............. E21B 44/00

OTHER PUBLICATIONS

International Search Report and Written Opinion of PCT Application No. PCT/US2013/061984 dated Jan 21, 2014 (9 pages).

* cited by examiner

*Primary Examiner* — Daniel L Murphy
(74) *Attorney, Agent, or Firm* — Alec J. McGinn (57) ABSTRACT

A method for displaying exploration and production (E&P) data set during an E&P tool session of a field having a subterranean formation. The method includes generating, by an E&P tool executing on a computer processor during the E&P tool session, an E&P data set based on a subterranean formation field data set, displaying, to a user controlling the E&P tool session, the E&P data set as a multi-dimensional canvas, generating, by the computer processor and in response to a user input identifying a point in the multi-dimensional canvas, a strike&dip tool tip, and further displaying the strike&dip tool tip superimposing the multi-dimensional canvas, wherein the strike&dip tool tip is tagged to the point in the multi-dimensional canvas.

20 Claims, 6 Drawing Sheets

STRIKE AND DIP TOOLTIP FOR SEISMIC SECTIONS

CROSS REFERENCE TO RELATED APPLICATION

This application claims priority pursuant to 35 U.S.C. §119 (e), to the filing date of U.S. Patent Application Ser. No. 61/706,662 entitled "STRIKE AND DIP TOOLTIP FOR SEISMIC SECTIONS," filed on Sep. 27, 2012, which is hereby incorporated by reference in its entirety.

BACKGROUND

Operations, such as geophysical surveying, drilling, logging, well completion, and production, are typically performed to locate and gather valuable downhole fluids. Surveys are often performed using acquisition methodologies, such as seismic mapping, resistivity mapping, etc. to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required to extract the fluid or minerals. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion, and/or production using the wellbore.

Models of subsurface hydrocarbon reservoirs and oil wells are often used in simulation (e.g., in modeling oil well behavior) to increase yields and to accelerate and/or enhance production from oil wells. Seismic interpretation tools and seismic-to-simulation programs, such as PETREL® (a registered trademark of Schlumberger Technology Corporation, Houston, Tex.), can include numerous functionalities and apply complex techniques across many aspects of modeling and simulating. Such programs typically include a large suite of tools and different programs, and are referred to as an exploration and production (E&P) application or E&P tool. Users of such systems may spend many hours per day working with these tools in an effort to optimize geological interpretations and reservoir engineering development scenarios. The data generated in such efforts is generally referred to as E&P data set.

SUMMARY

In general, in one aspect, the invention relates to a method for displaying exploration and production (E&P) data set during an E&P tool session of a field having a subterranean formation. The method includes (1) generating, by an E&P tool executing on a computer processor during the E&P tool session, an E&P data set based on a subterranean formation field data set, (2) displaying, to a user controlling the E&P tool session, the E&P data set as a multi-dimensional canvas, (3) generating, by the computer processor and in response to a user input identifying a point in the multi-dimensional canvas, a strike&dip tool tip, comprising: (i) determining, based on the E&P data set, a location of the subterranean formation that corresponds to the point in the multi-dimensional canvas, (ii) retrieving, from the subterranean formation field data set, dip information associated with a rock layer at the location of the subterranean formation, and (iii) generating, based on the rock layer dip information, a graphic component of the strike&dip tool tip, wherein the graphic component is oriented on the multi-dimensional canvas to represent a first orientation of the rock layer at the location of the subterranean, and (4) further displaying the strike&dip tool tip superimposing the multi-dimensional canvas, wherein the strike&dip tool tip is tagged to the point in the multi-dimensional canvas.

Other aspects of the invention will be apparent from the following description and the appended claims.

BRIEF DESCRIPTION OF DRAWINGS

The patent or application file contains at least one drawing executed in color. Copies of this patent or patent application publication with color drawing(s) will be provided by the Office upon request and payment of the necessary fee. The appended drawings illustrate several embodiments of a strike and dip (also referred to as srike&dip) tooltip for seismic sections and are not to be considered limiting of its scope, for the strike and dip tooltip for seismic sections may admit to other equally effective embodiments.

FIG. 1.1 is a schematic view, partially in cross-section, of a field in which one or more embodiments of a strike and dip tooltip for seismic sections may be implemented.

FIG. 1.2 shows an exploration and production computer system in accordance with one or more embodiments.

FIG. 1.3 shows a schematic view of strike and dip of rock layers in accordance with one or more embodiments.

DETAILED DESCRIPTION

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

The tooltip (also referred to as an infotip or a hint) is a graphical user interface (GUI) element. It may be used in conjunction with a cursor, usually in the form of a pointer. The user generally hovers the pointer over an item displayed in the GUI without clicking it, and a tooltip may appear as a small "hover box" containing information about the item being hovered over. Tooltips generally contain text rather than graphics. Embodiments of a strike and dip tooltip for seismic sections provide a method and system to use a modified tooltip with an inserted strike and dip graphic symbol. The modified tooltip facilitates geologists in visualizing objects in a three-dimensional (3D) E&P data set. The tooltip still contains text information, but now includes a graphical strike&dip symbol. In one or more embodiments, the modified tooltip further includes a highlighted (e.g., colored in red) line segment drawn over the strike&dip symbol to indicate the azimuth of the seismic section. This highlighted line segment provides an important piece of information allowing the seismic interpreter to visualize the relationship between apparent dip and true dip.

Figure 11:
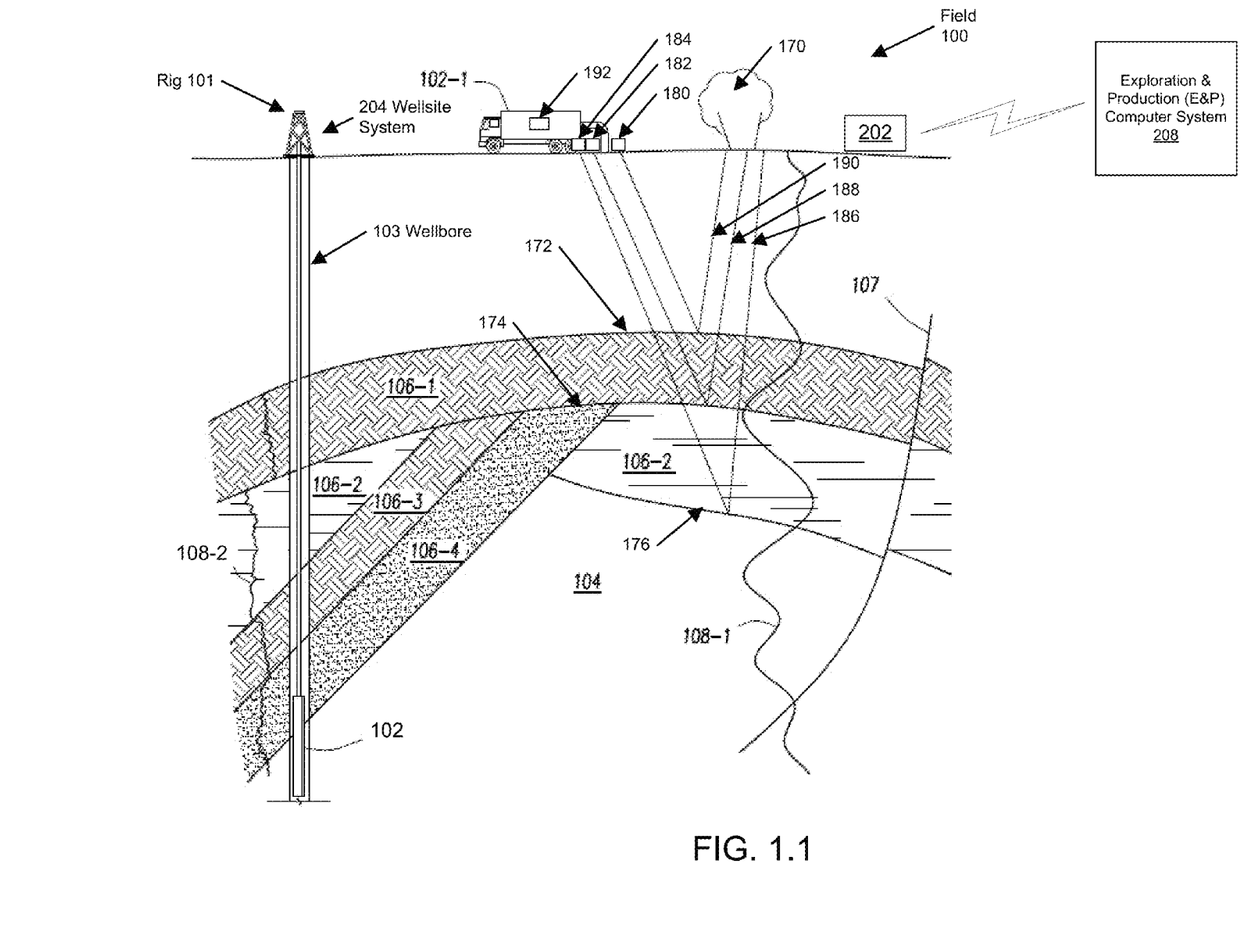

FIG. 1.1 depicts a schematic view, partially in cross section, of a field (100) in which one or more embodiments of a strike and dip tooltip for seismic sections may be implemented. In one or more embodiments, one or more of the modules and elements shown in FIG. 1.1 may be omitted, repeated, and/or substituted. Accordingly, embodiments of a strike and dip tooltip for seismic sections should not be considered limited to the specific arrangements of modules shown in FIG. 1.1.

As shown in FIG. 1.1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, various survey tools and/or data acquisition tools are adapted to measure the formation and detect the characteristics of the geological structures of the formation. As noted above, the outputs of these various survey tools and/or data acquisition tools, as well as data derived from analyzing the outputs, are considered as part of the historic information.

As shown in FIG. 1.1, seismic truck (102-1) represents a survey tool that is adapted to measure properties of the subterranean formation in a seismic survey operation based on sound vibrations. One such sound vibration (e.g., 186, 188, 190) generated by a source (170) reflects off a plurality of horizons (e.g., 172, 174, 176) in the subterranean formation (104). Each of the sound vibrations (e.g., 186, 188, 190) are received by one or more sensors (e.g., 180, 182, 184), such as geophone-receivers, situated on the earth's surface. The geophones produce electrical output signals, which may be transmitted, for example, as input data to a computer (192) on the seismic truck (102-1). Responsive to the input data, the computer (192) may generate a seismic data output, which may be logged and provided to a surface unit (202) by the computer (192) for further analysis. The computer (192) may be the computer system shown and described in relation to FIG. 4.

Further as shown in FIG. 1.1, the wellsite system (204) is associated with a rig (101), a wellbore (103), and other wellsite equipment and is configured to perform wellbore operations, such as logging, drilling, fracturing, production, or other applicable operations. Generally, survey operations and wellbore operations are referred to as field operations of the field (100). These field operations are typically performed as directed by the surface unit (202).

In one or more embodiments, the surface unit (202) is operatively coupled to the computer (192) and/or a wellsite system (204). In particular, the surface unit (202) is configured to communicate with the computer (192) and/or the data acquisition tool (102) to send commands to the computer (192) and/or the data acquisition tools (102) and to receive data therefrom. For example, the data acquisition tool (102) may be adapted for measuring downhole properties using logging-while-drilling ("LWD") tools. In one or more embodiments, surface unit (202) may be located at the wellsite system (204) and/or remote locations. The surface unit (202) may be provided with computer facilities for receiving, storing, processing, and/or analyzing data from the computer (192), the data acquisition tool (102), or other part of the field (100). The surface unit (202) may also be provided with or functionally for actuating mechanisms at the field (100). The surface unit (202) may then send command signals to the field (100) in response to data received, for example to control and/or optimize various field operations described above.

Generally, the data received by the surface unit (202) is referred to as the subterranean formation field data set. In one or more embodiments, the subterranean formation field data set represents characteristics of the subterranean formation (104) and may include seismic data and/or information related to porosity, saturation, permeability, natural fractures, stress magnitude and orientations, elastic properties, etc. during a drilling, fracturing, logging, or production operation of the wellbore (103) at the wellsite system (204). For example, data plot (108-1) may be a seismic two-way response time or other types of seismic measurement data. In another example, data plot (108-2) may be a wireline log, which is a measurement of a formation property as a function of depth taken by an electrically powered instrument to infer properties and make decisions about drilling and production operations. The record of the measurements, typically on a long strip of paper, may also be referred to as a log. Measurements obtained by a wireline log may include resistivity measurements obtained by a resistivity measuring tool. In yet another example, the data plot (108-2) may be a plot of a dynamic property, such as the fluid flow rate over time during production operations. Those skilled in the art will appreciate that other data may also be collected, such as, but not limited to, historical data, user inputs, economic information, other measurement data, and other parameters of interest.

In one or more embodiments, the surface unit (202) is communicatively coupled to an exploration and production (E&P) computer system (208). In one or more embodiments, the data received by the surface unit (202) may be sent to the E&P computer system (208) for further analysis. Generally, the E&P computer system (208) is configured to analyze, model, control, optimize, or perform other management tasks of the aforementioned field operations based on the data provided from the surface unit (202). In one or more embodiments, the E&P computer system (208) is provided with functionality for manipulating and analyzing the data, such as performing seismic interpretation or borehole resistivity image log interpretation to identify geological surfaces in the subterranean formation (104) or performing simulation, planning, and optimization of production operations of the wellsite system (204). Generally, the result generated by the E&P computer system (208) is referred to as the exploration and production (E&P) data set. In one or more embodiments, the E&P data set may be displayed for user viewing using a 2 dimensional (2D) display, 3 dimensional (3D) display, or other suitable displays. Although the surface unit (202) is shown as separate from the E&P computer system (208) in FIG. 1.1, in other examples, the surface unit (202) and the E&P computer system (208) may also be combined.

Figure 12:
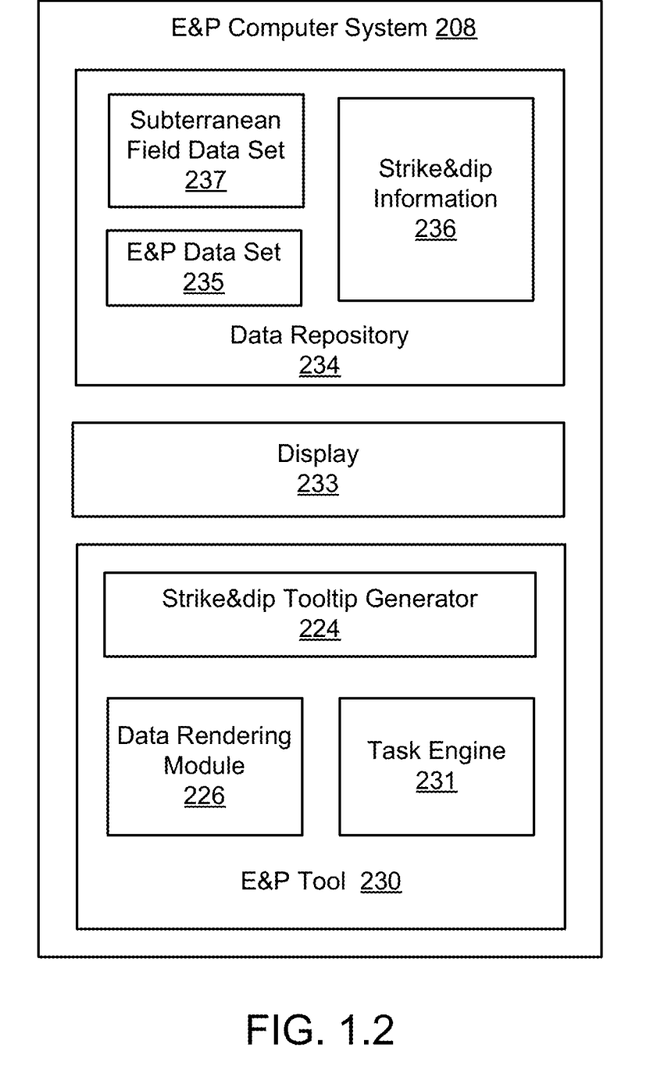

FIG. 1.2 shows more details of the E&P computer system (208) in which one or more embodiments of a strike and dip tooltip for seismic sections may be implemented. In one or more embodiments, one or more of the modules and elements shown in FIG. 1.2 may be omitted, repeated, and/or substituted. Accordingly, embodiments of a strike and dip tooltip for seismic sections should not be considered limited to the specific arrangements of modules shown in FIG. 1.2.

As shown in FIG. 1.2, the E&P computer system (208) includes E&P tool (230) having a strike&dip tooltip generator (224), a task engine (231), a data rendering module (226), a data repository (234), and a display (233). Each of these elements is described below.

In one or more embodiments, the E&P tool (230) includes software instructions stored in a memory and executing on a processor to communicate with the surface unit (202) for receiving data therefrom and to manage (e.g., analyze, model, control, optimize, or perform other management tasks) the aforementioned field operations based on the received data (e.g., data plots (108-1), (108) depicted in FIG. 1.1 above). In one or more embodiments, the received data is stored in the data repository (234) as the subterranean field data set (237) to be processed by the E&P tool (230). One or more field operation management tasks (e.g., analysis task, modeling task, control task, optimization task, etc.) may be performed in an execution pass of the E&P tool (230), referred to as an E&P tool session. During the E&P tool session, the received data is manipulated by the task engine (231) to generate, continuously or intermittently, preliminary and/or final that are stored in the data repository (234) as the E&P data set (235). The E&P data set (235) may include, for be stored separate from, the subterranean field data set (237). Further during the E&P tool session, the E&P data set (235) is rendered and displayed to the user using the data rendering module (226) and the display (233), respectively. For example, the E&P tool session may be a seismic interpretation session where the task engine (231) processes the seismic response time data set and the data rendering module (226) renders interpreted seismic results to be displayed to the user using the display (233). In one or more embodiments, the display (233) may be a 2D display, a 3D display, or other suitable display device. Any intermediate seismic data and the interpreted seismic results are examples of the E&P data set (235). The rendered 2D or 3D display of the E&P data set (235) is referred to as a multi-dimensional canvas. For example, the 2D or 3D display of the intermediate seismic data and/or interpreted seismic results is referred to as a seismic canvas. The data repository (234) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The data repository (234) may be a device internal to the E&P computer system (208). Alternatively, the data repository (234) may be an external storage device operatively connected to the E&P computer system (208). The processor and memory of the E&P computer system (208) are not explicitly depicted in FIG. 1.2 so as not to obscure other elements of the E&P computer system (208). An example of such processor and memory is described in reference to FIG. 4 below.

Figure 13:
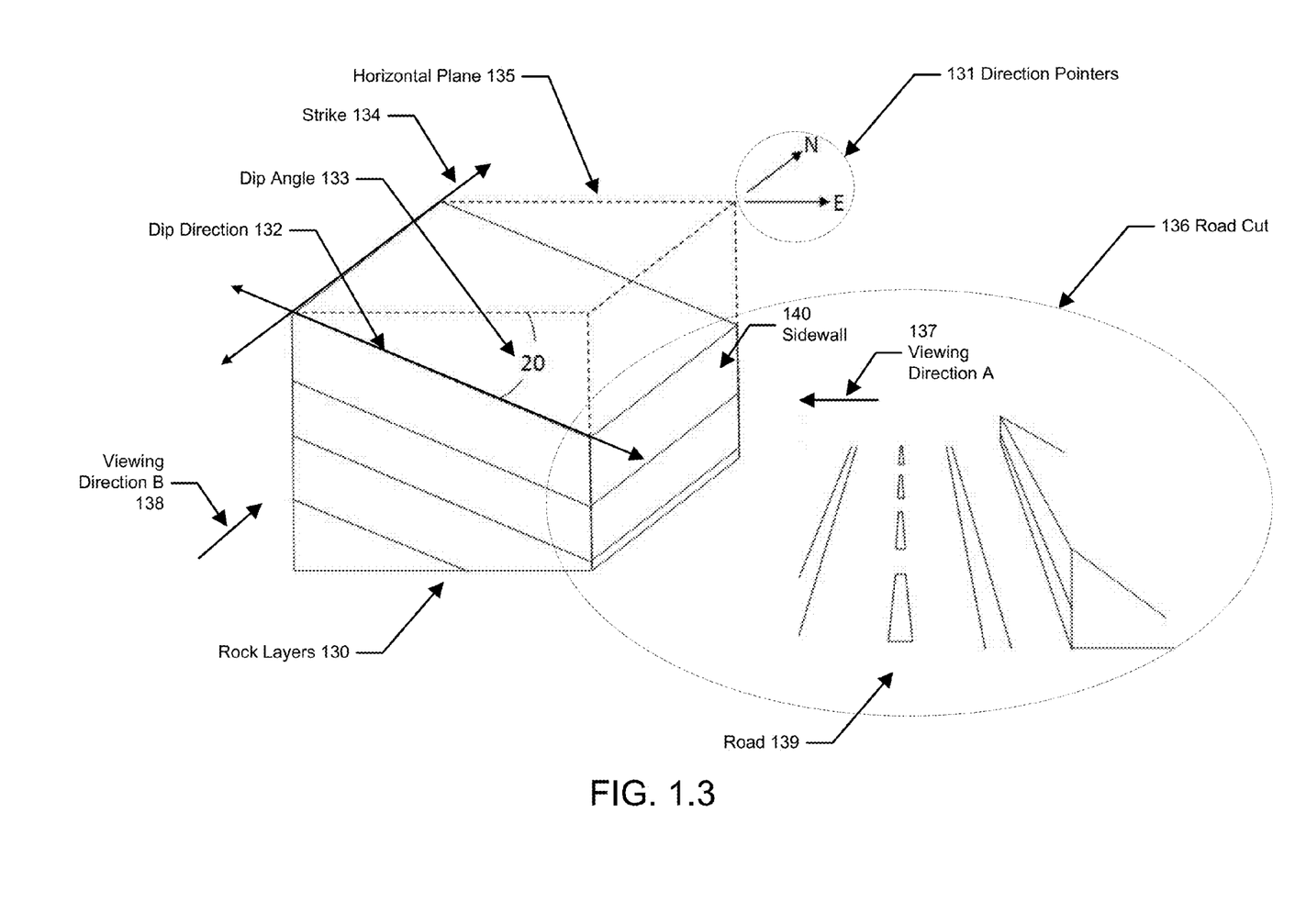

In one or more embodiments, the strike&dip tooltip generator (224) is configured to generate text and graphic content of a strike&dip tooltip based on subterranean rock layer orientation and inclination information. Accordingly, the text and graphic content of the strike&dip tooltip is embedded into the E&P data set (235) before being rendered and displayed to the user. In one or more embodiments, the strike&dip information (236) stored in the data repository (234) includes the text and graphic content of the strike&dip tool tip, as well as subterranean rock layer orientation and inclination information used to generate the strike&dip tool tip. Examples of the subterranean rock layer orientation and inclination information are shown in FIG. 1.3 below.

In general, the term "dip" is used by geologists to describe inclination information of many types of geologic structures—bed boundaries, fractures, cross bedding, faults, and unconformities. FIG. 1.3 shows a schematic diagram describing the definitions of strike, dip, apparent dip, and road cut. As shown in FIG. 1.3, the rock layers (130) have a dip defined by the dip angle (133) (e.g., 20 degrees) and a dip direction (132) (e.g., east-west direction according to the direction pointers (131)). In particular, the dip angle (133) is in a vertical plane perpendicular to the dip direction (132), and is referred to as the true dip, or simply the dip. In addition, the intersection of a horizontal plane (135) with the rock layers (130) is referred to as the strike (e.g., in the north-south direction) of the rock layers (130). If one were to hike along the top of the rock layers (130), hiking along the dip direction (132) would lead directly downhill. Hiking along the strike (134) direction would result in no change in elevation. In other words, the hiker would neither ascend nor descend. Note the strike (134) is always perpendicular to the dip direction (132). Because roads are often constructed by cutting through hills, an imaginary cut through the rock layers (130) is referred to as a road cut, such as the road cut (136) shown as parallel to the strike (134). In this context, looking out car windows from the road (139) along the viewing direction A (137), the sidewall (140) of the road cut (136) appears to contain horizontal (i.e., 0 degree) layers. In other words, the rock layers (130) have an apparent dip of 0 degree from the viewing direction A (137). In contrast if the road cut (136) were to run east-west, then a driver looking out car windows along the viewing direction B(138) (i.e., the direction of the strike (134)) will see the rock layers (130) having the true dip of 20 degrees. In another example if the road cut (136) were to run at some angle between the strike (134) and the dip direction (132), e.g., southwest-northeast, the apparent dip would be about 14 degrees.

Figure 3:
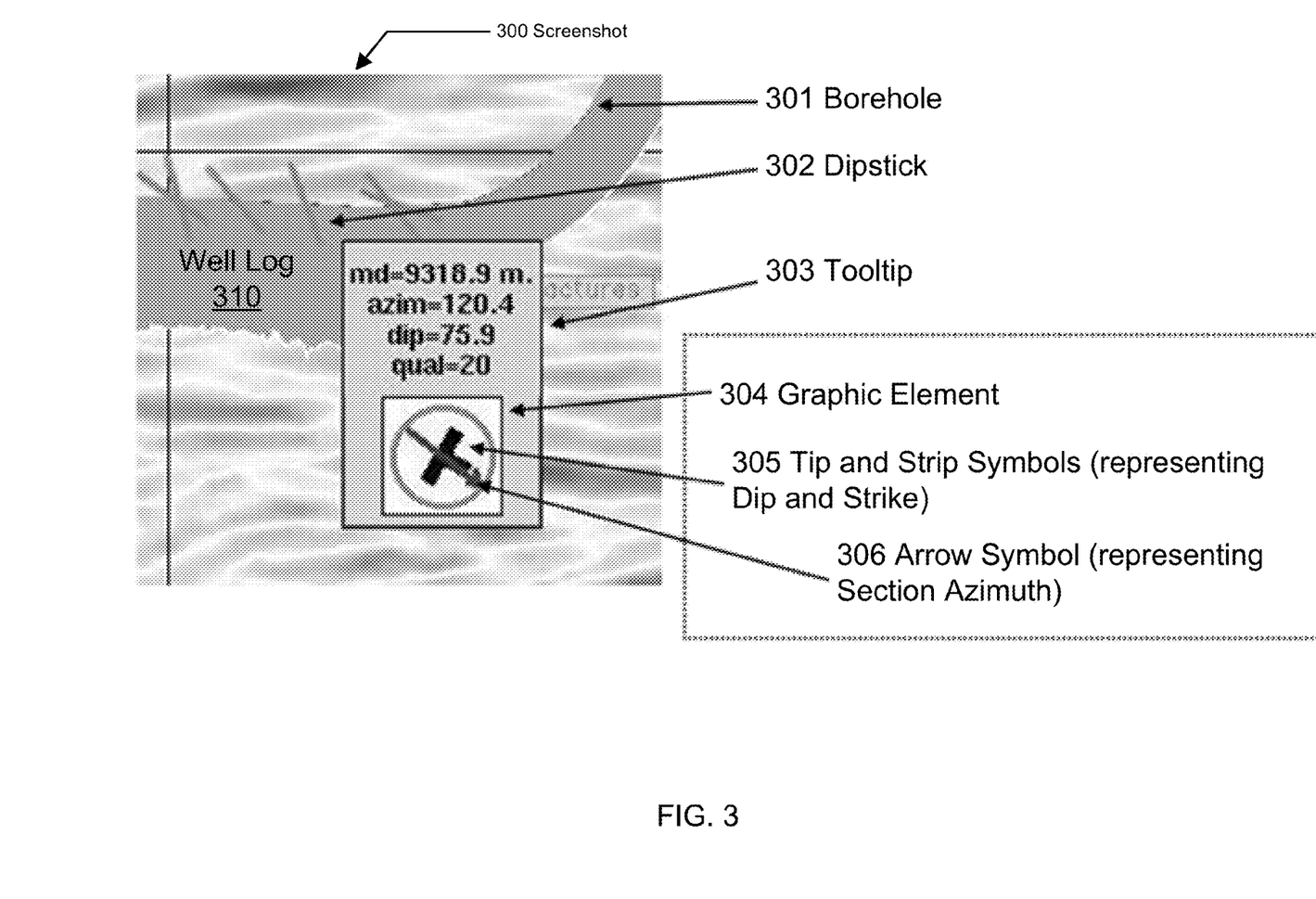
FIG. 3 shows an example of a strike and dip tooltip for seismic sections in accordance with one or more embodiments.

In one or more embodiments, apparent dip information is shown on a seismic canvas in the form of a slanted line segment referred to as a dipstick. In addition, the strike&dip symbol is incorporated into a tooltip when the cursor pointer is hovered over the dipstick. Examples of dipsticks and the tooltip containing the strike&dip information are shown in FIG. 3 below.

Figure 2:
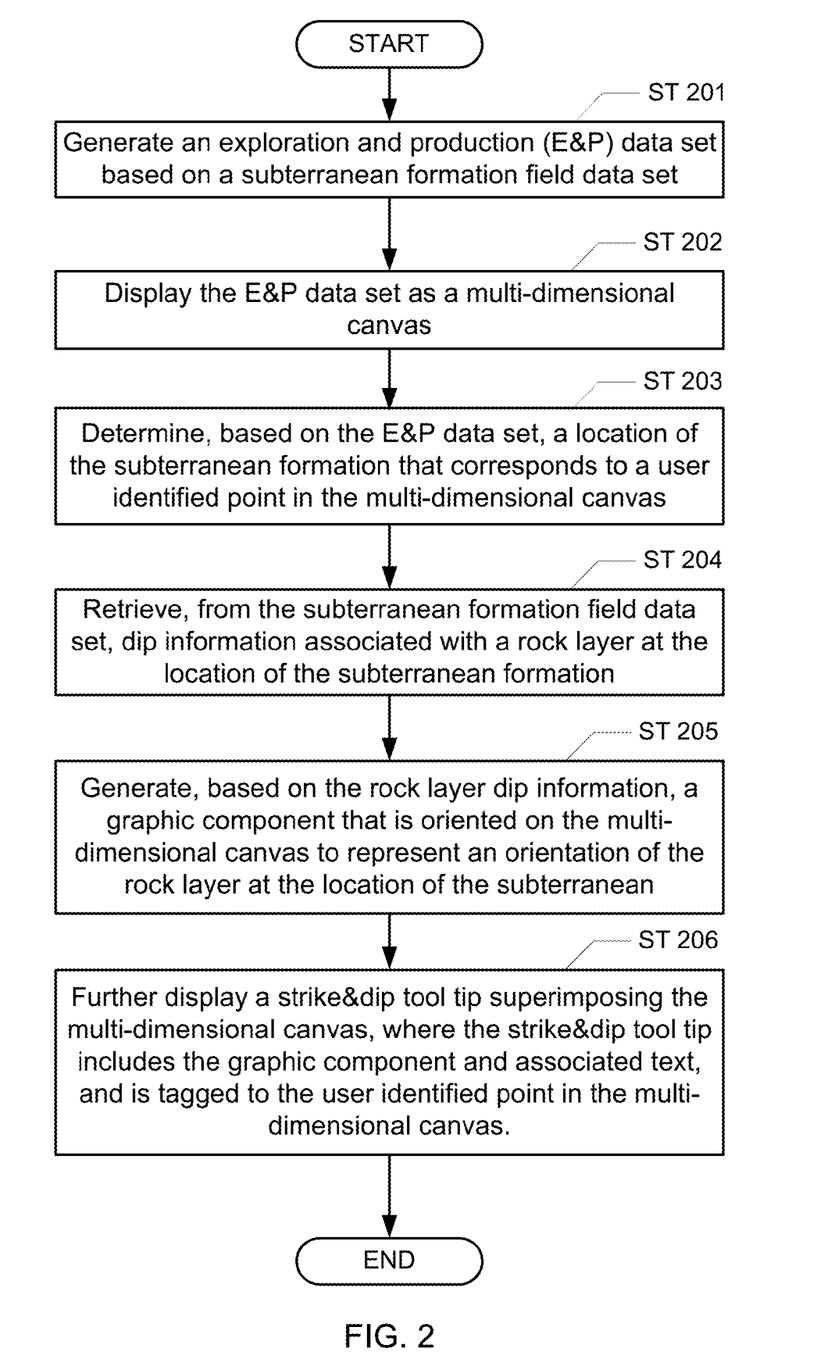
FIG. 2 shows a flowchart of a method of a strike and dip tooltip for seismic sections in accordance with one or more embodiments.

FIG. 2 shows a flow chart for using a strike and dip tooltip for seismic sections in accordance with one or more embodiments of the invention. In one or more embodiments of the invention, the method of FIG. 2 may be practiced using the E&P computer system (208) described in reference to FIGS. 1.1 and 1.2 above. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

Generally, the flowchart for using a strike and dip tooltip for seismic sections describes a method for displaying exploration and production (E&P) data set during an E&P tool session of a field having a subterranean formation.

Initially in Block 201, an E&P data set is generated based on a subterranean formation field data set. For example, the subterranean formation field data set may be un-processed seismic response data obtained using seismic sensors. In addition, the subterranean formation field data set may further include subterranean data obtained using other subterranean and/or borehole imaging devices. In one or more embodiments, the E&P data set is generated by an E&P tool during an E&P tool session, as described in reference to FIG. 1.1 above. For example, the E&P data set may be a seismic volume and the E&P tool session may be a seismic interpretation session.

In Block 202, the E&P data set is displayed as a multi-dimensional canvas to a user controlling the E&P tool session. For example, the E&P data set may be displayed using a 2D or 3D display to a seismic interpreter user.

In Blocks 203-205, in response to a user input identifying a point in the multi-dimensional canvas, a strike&dip tool tip is generated. Specifically in Block 203, a location of the subterranean formation is determined, based on the E&P data set, and corresponds to the point in the multi-dimensional canvas. For example, the user input may be a cursor hover over the point in the multi-dimensional canvas.

In Block 204, dip information associated with a rock layer at the location identified by Block 203 is retrieved from the subterranean formation field data set. In one or more embodiments, the dip information includes one or more of the strike, dip, apparent dip, and road cut shown in FIG. 1.3 above.

In Block 205, a graphic component of the strike&dip tool tip is generated based on the rock layer dip information. In particular, the graphic component is oriented on the multi-dimensional canvas to represent one or more of the dip angle, dip direction, and strike direction of the rock layer at the location of the subterranean. In addition, the graphic component may further represent additional orientation information of the rock layer.

In one or more embodiments, the graphic element includes a tip symbol oriented to represent the dip angle and the dip direction, as well as a strip symbol oriented to represent the strike direction. For example, the graphic element may be in the form of an upper case letter "T" where the hat of the upper case letter "T" is the strip symbol and the trunk of the upper case letter "T" is the tip symbol.

In one or more embodiments, the graphic element further includes an additional symbol that is oriented on the multi-dimensional canvas to represent additional orientation information associated with the E&P data set at the point in the multi-dimensional canvas. For example where the E&P data set is a seismic volume, the additional orientation may be a section azimuth of the seismic volume. The additional symbol may be a section azimuth symbol, such as an arrow symbol oriented to represent the section azimuth of the seismic volume.

In one or more embodiments, in Block 205, a text component of the strike&dip tool tip is also generated based on the dip information. In particular, the text component describes the information associated with the tip symbol, strip symbol, and the arrow symbol.

In Block 206, the strike&dip tool tip displayed superimposing the multi-dimensional canvas. Specifically, the strike&dip tool tip is tagged to the point in the multi-dimensional canvas.

In one or more embodiments, in Block 202, a borehole trajectory is further displayed superimposing the multi-dimensional canvas with one or more markers intersecting the borehole trajectory. In particular, the markers are referred to as dipsticks and represent apparent dip information of the rock layer corresponding to where the dipsticks intersect the borehole trajectory. For example, the apparent dip information is obtained using LWD tools. In one example scenario, the cursor hover is received over each of the one or more dipsticks. In such example, the strike&dip tooltip supplements the apparent dip information represented by each dipstick. In another example scenario, a sequence of cursor hovers is received such that the user identified location moves along the borehole trajectory on the multi-dimensional canvas and passing through the one or more dipsticks. In this example, the strike&dip tool tip presents an animation of the tip symbol, strip symbol, and the arrow symbol as the user moves the cursor along the borehole trajectory on the multi-dimensional canvas. In one or more embodiments, the dipstick and/or the strike&dip tool tip become highlighted (e.g., change color, expand/shrink in size, flash, etc.) when they coincide each other.

FIG. 3 shows an application example in accordance with one or more embodiments of the invention. This application example may be practiced using the system (100) of FIGS. 1.1-1.2 and based on the method described with respect to FIG. 2 above.

FIG. 3 shows a screenshot (300) of a multi-dimensional canvas as viewed by a user. As shown in FIG. 3, the background of the multi-dimensional canvas is seismic data. The slanted short line segments are dipsticks (e.g., dipstick (302)) marking various locations along a deviated borehole (301). Beneath the borehole (301) is a large swath representing the well log (310). The tooltip (303) shows information for the dipstick (302) to its upper left. The tooltip (303) is shown as the rectangular box containing text above the graphic element (304) containing the aforementioned tip and strip symbols (305) and the arrow symbol (306).

As noted above, the tip and strip symbols (305) are "T" shaped and represent the strike and dip at the location where the dipstick (302) intersects the borehole (301). Specifically, the orientation of the hat of the "T" indicates the strike direction; the orientation of the trunk of the "T" indicates the dip direction. In addition, the orientation of the arrow symbol indicates the azimuth of the seismic section at the location of the dipstick (302).

In the screenshot (300), North is defined to be up. The text component of the tooltip (303) shows a dip azimuth of 120.4 degrees, with a dip angle of 75.9 degrees. Because, in this example, the dip azimuth is nearly parallel to the azimuth of the seismic section, the apparent dip represented by the dipstick (302) is very close to the true dip angle of 75.0 degrees. By contrast, if the seismic azimuth represented by the arrow symbol (306) had been parallel to the strike direction represented by the hat of the "T", the apparent dip would have been 0 degrees.

As noted above, the tip and strip symbols representing the strike and dip continually update as the user moves the mouse cursor away from the dipstick (302) to another dipstick along the borehole (301).

Figure 4:
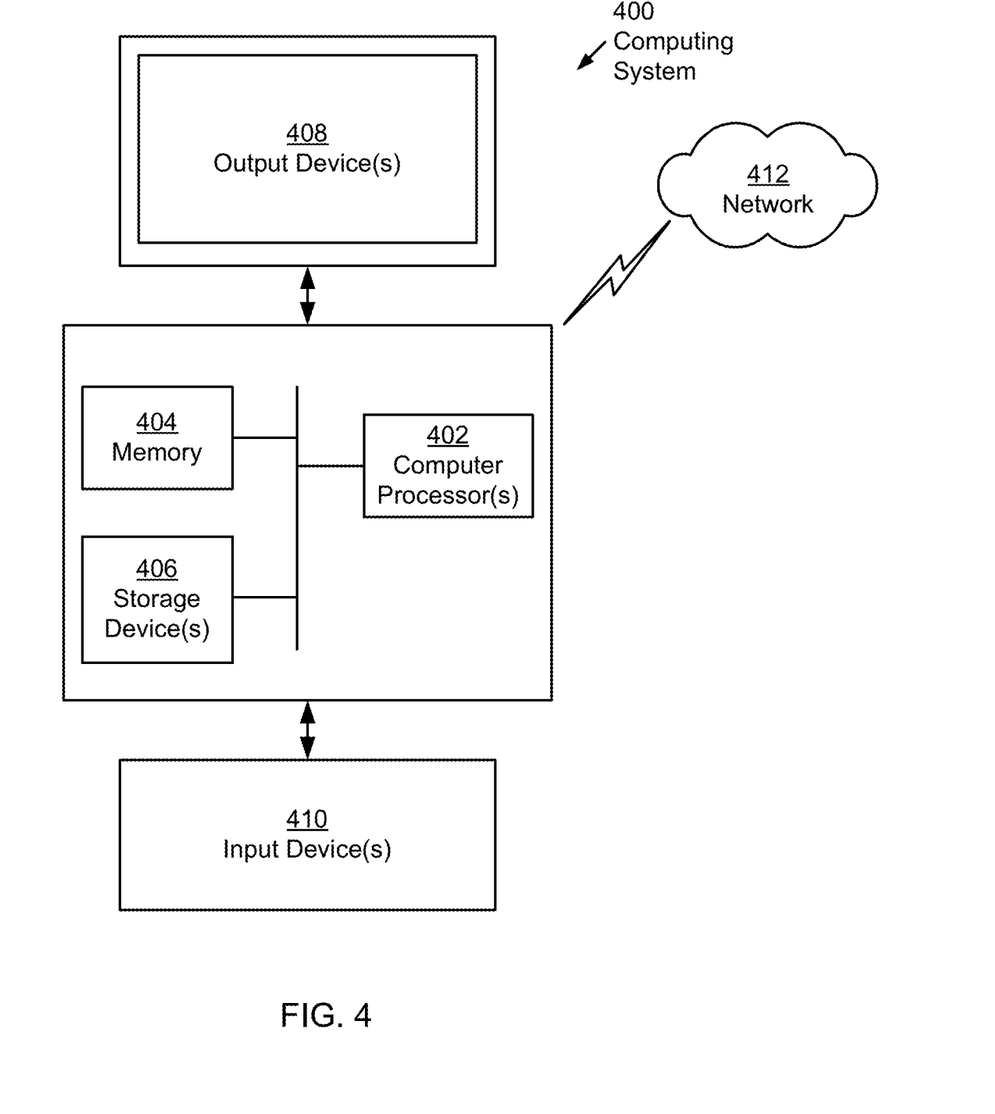
FIG. 4 depicts a computer system using which one or more embodiments of a strike and dip tooltip for seismic sections may be implemented.

Embodiments of a strike and dip tooltip for seismic sections may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of a strike and dip tooltip for seismic sections. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of a strike and dip tooltip for seismic sections may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of a strike and dip tooltip for seismic sections.

Further, one or more elements of the aforementioned computing system (400) may be located at a remote location and connected to the other elements over a network (412). Further, embodiments of a strike and dip tooltip for seismic sections may be implemented on a distributed system having a plurality of nodes, where each portion of the strike and dip tooltip for seismic sections may be located on a different node within the distributed system. In one embodiment of the strike and dip tooltip for seismic sections, the node corresponds to a distinct computing device. Alternatively, the node may correspond to a computer processor with associated physical memory. The node may alternatively correspond to a computer processor or micro-core of a computer processor with shared memory and/or resources.

The systems and methods provided relate to the acquisition of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware, or combinations thereof.

While the strike and dip tooltip for seismic sections has been described with respect to a limited number of embodiments, those skilled in the art, having benefit of this disclosure, will appreciate that other embodiments can be devised which do not depart from the scope of the strike and dip tooltip for seismic sections as disclosed herein. Accordingly, the scope of the strike and dip tooltip for seismic sections should be limited only by the attached claims.

What is claimed is:

1. A method for displaying a subterranean formation field data set of a field having a subterranean formation, comprising:
 displaying a borehole trajectory penetrating the subterranean formation;
 generating, in response to a user pointing device input identifying a point on the borehole trajectory, a strike&dip tool tip, comprising:
  determining, a location of the subterranean formation that corresponds to the point on the borehole trajectory;
  retrieving, from the subterranean formation field data set, dip information associated with a rock layer at the location of the subterranean formation; and
  generating, based on the rock layer dip information, a graphic component of the strike&dip tool tip, wherein the graphic component is oriented on the borehole trajectory to represent a first orientation of the rock layer at the location of the subterranean;
 further displaying the strike&dip tool tip superimposing the borehole trajectory, wherein the strike&dip tool tip is tagged to the point on the borehole trajectory;
 receiving a change in the user pointing device input to move the point along the borehole trajectory; and
 continually updating, in response to moving the point along the borehole trajectory, the strike&dip tool tip to represent the first orientation of the rock layer along the borehole trajectory.

2. The method of claim 1,
 wherein the first orientation comprises a dip angle, a dip direction, and a strike direction, and
 wherein the graphic component comprises a tip symbol oriented to represent the dip angle and the dip direction and a strip symbol oriented to represent the strike direction.

3. The method of claim 2,
 wherein the graphic component is further oriented on the borehole trajectory to represent a second orientation associated with the subterranean formation field data set at the point on the borehole trajectory.

4. The method of claim 3,
 wherein the subterranean formation field data set comprises a seismic volume,
 wherein the second orientation comprises a section azimuth of the seismic volume, and
 wherein the graphic component further comprises a section azimuth symbol oriented to represent the section azimuth of the seismic volume,
 the method further comprising:
  displaying a relationship between an apparent dip and a true dip of the rock layer,
   wherein the relationship is represented by an angle between the tip symbol and the section azimuth symbol.

5. The method of claim 1, wherein generating the strike&dip tool tip further comprises:
 generating, based on the dip information, a text component of the strike&dip tool tip,
  wherein the text component describes the first orientation and the second orientation.

6. The method of claim 1,
 wherein the change in the user pointing device input comprises moving a mouse cursor along the borehole trajectory.

7. The method of claim 1, further comprising:
 displaying a dipstick intersecting the borehole trajectory,
 wherein the dipstick represents apparent dip information of the rock layer corresponding to where the dipstick intersects the borehole trajectory, and
 wherein the point on the borehole trajectory is identified on the dipstick.

8. A computer system for displaying a subterranean formation field data set of a field having a subterranean formation, comprising:
 a computer processor and memory;
 an E&P tool stored in the memory, executing on the computer processor, and comprising:
  a strike&dip tooltip generator configured to generate, in response to a user pointing device input identifying a point on a borehole trajectory penetrating the subterranean formation, a strike&dip tool tip, comprising:

determining a location of the subterranean formation that corresponds to the point on the borehole trajectory;

retrieving, from the subterranean formation field data set, dip information associated with a rock layer at the location of the subterranean formation;

generating, based on the rock layer dip information, a graphic component of the strike&dip tool tip, wherein the graphic component is oriented on the borehole trajectory to represent a first orientation of the rock layer at the location of the subterranean;

receiving a change in the user pointing device input to move the point along the borehole trajectory; and continually updating, in response to moving the point along the borehole trajectory, the strike&dip tool tip to represent the first orientation of the rock layer along the borehole trajectory; and a data rendering module configured to render the strike&dip tool tip superimposing the borehole trajectory, wherein the strike&dip tool tip is tagged to the point on the borehole trajectory;

a display configured to display the borehole trajectory superimposed by the strike&dip tool tip; and a repository configured to store the subterranean formation field data set.

9. The computer system of claim 8, wherein the first orientation comprises a dip angle, a dip direction, and a strike direction, and wherein the graphic component comprises a tip symbol oriented to represent the dip angle and the dip direction and a strip symbol oriented to represent the strike direction.

10. The computer system of claim 9, wherein the graphic component is further oriented on the borehole trajectory to represent a second orientation associated with the subterranean formation field data set at the point on the borehole trajectory.

11. The computer system of claim 10, wherein the subterranean formation field data set comprises a seismic volume, wherein the second orientation comprises a section azimuth of the seismic volume, wherein the graphic component further comprises a section azimuth symbol oriented to represent the section azimuth of the seismic volume, and wherein the display is further configured to:

display a relationship between an apparent dip and a true dip of the rock layer, wherein the relationship is represented by an angle between the tip symbol and the section azimuth symbol.

12. The computer system of claim 10, wherein generating the strike&dip tool tip further comprises:

generating, based on the dip information, a text component of the strike&dip tool tip, wherein the text component describes the first orientation and the second orientation.

13. The computer system of claim 8, wherein the change in the user pointing device input comprises moving a mouse cursor along the borehole trajectory.

14. The computer system of claim ,1 wherein the display is further configured to:

display a dipstick intersecting the borehole trajectory, wherein the dipstick represents apparent dip information of the rock layer corresponding to where the dipstick intersects the borehole trajectory, and wherein the point on the borehole trajectory is identified on the dipstick.

15. A non-transitory computer readable medium comprising instructions for displaying a subterranean formation field data set of a field having a subterranean formation, the instructions when executed by a computer processor comprising functionality for:

displaying a borehole trajectory superimposing the subterranean formation;

generating, in response to a user pointing device input identifying a point on the borehole trajectory, a strike&dip tool tip, comprising:

determining a location of the subterranean formation that corresponds to the point on the borehole trajectory;

retrieving, from the subterranean formation field data set, dip information associated with a rock layer at the location of the subterranean formation; and generating, based on the rock layer dip information, a graphic component of the strike&dip tool tip, wherein the graphic component is oriented on the borehole trajectory to represent a first orientation of the rock layer at the location of the subterranean;

further displaying the strike&dip tool tip superimposing the borehole trajectory, wherein the strike&dip tool tip is tagged to the point on the borehole trajectory;

receiving a change in the user pointing device input to move the point along the borehole trajectory; and continually updating, in response to moving the point along the borehole trajectory, the strike&dip tool tip to represent the first orientation of the rock layer along the borehole trajectory.

16. The non-transitory computer readable medium of claim 15, wherein the first orientation comprises a dip angle, a dip direction, and a strike direction, and wherein the graphic component comprises a tip symbol oriented to represent the dip angle and the dip direction and a strip symbol oriented to represent the strike direction.

17. The non-transitory computer readable medium of claim 16, wherein the graphic component is further oriented on the borehole trajectory to represent a second orientation associated with the subterranean formation field data set at the point on the borehole trajectory.

18. The non-transitory computer readable medium of claim 17, wherein the subterranean formation field data set comprises a seismic volume, wherein the second orientation comprises a section azimuth of the seismic volume, and wherein the graphic component further comprises a section azimuth symbol oriented to represent the section azimuth of the seismic volume, the instructions when executed by the computer processor further comprising functionality for:

display a relationship between an apparent dip and a true dip of the rock layer, wherein the relationship is represented by an angle between the tip symbol and the section azimuth symbol.

19. The non-transitory computer readable medium of claim 17, wherein generating the strike&dip tool tip further comprises:

generating, based on the dip information, a text component of the strike&dip tool tip, wherein the text component describes the first orientation and the second orientation.

20. The non-transitory computer readable medium of claim 15, the instructions when executed by the computer processor further comprising functionality for:
   displaying a dipstick intersecting the borehole trajectory,
   wherein the point on the borehole trajectory is identified on the borehole trajectory,
   wherein the dipstick represents apparent dip information of the rock layer corresponding to where the dipstick intersects the borehole trajectory.

* * * * *